US008360232B2

(12) United States Patent
Hazenbroek

(10) Patent No.: US 8,360,232 B2
(45) Date of Patent: Jan. 29, 2013

(54) ROTATABLE INDEXED ARTICLE SUPPORT FOR A CONVEYOR

(75) Inventor: Jacobus Eliza Hazenbroek, Oud-Beijerland (NL)

(73) Assignee: Foodmate BV, Oud-Beijerland (NL)

( * ) Notice: Subject to any disclaimer, the term of this patent is extended or adjusted under 35 U.S.C. 154(b) by 159 days.

(21) Appl. No.: 13/011,060

(22) Filed: Jan. 21, 2011

(65) Prior Publication Data

US 2011/0253505 A1    Oct. 20, 2011

(30) Foreign Application Priority Data

Apr. 19, 2010  (DK) ...................................... 2004574

(51) Int. Cl.
*B65G 17/32* (2006.01)
(52) U.S. Cl. ..................................... 198/682; 198/465.4
(58) Field of Classification Search .................. 198/679, 198/678.1, 682, 377.1, 378, 465.4
See application file for complete search history.

(56) References Cited

U.S. PATENT DOCUMENTS

| 3,956,794 | A |   | 5/1976  | Verbakel   |        |
|-----------|---|---|---------|------------|--------|
| 3,969,790 | A |   | 7/1976  | Smorenburg |        |
| 3,979,793 | A |   | 9/1976  | Hazenbroek |        |
| 3,983,601 | A |   | 10/1976 | Verbakel   |        |
| 3,990,128 | A |   | 11/1976 | van Mil    |        |
| 4,011,573 | A | * | 3/1977  | Braico     | 396/621|
| 4,034,440 | A |   | 7/1977  | van Mil    |        |
| 4,096,950 | A | * | 6/1978  | Brook      | 177/50 |
| 4,118,829 | A |   | 10/1978 | Harben, Jr.|        |
| 4,131,973 | A |   | 1/1979  | Verbakel   |        |
| 4,147,012 | A |   | 4/1979  | van Mil    |        |
| 4,153,971 | A |   | 5/1979  | Simonds    |        |
| 4,153,972 | A |   | 5/1979  | Harben et al.|      |
| 4,178,659 | A |   | 12/1979 | Simonds    |        |
| 4,203,178 | A |   | 5/1980  | Hazenbroek |        |
| 4,283,813 | A |   | 8/1981  | House      |        |
| 4,292,709 | A |   | 10/1981 | van Mil    |        |
| 4,388,811 | A |   | 6/1983  | Zebarth    |        |
| 4,395,795 | A |   | 8/1983  | Hazenbroek |        |

(Continued)

FOREIGN PATENT DOCUMENTS

| EP | 0 786 208 A1 | 7/1997 |
|----|--------------|--------|
| EP | 1 538 113 A1 | 6/2005 |

(Continued)

OTHER PUBLICATIONS

European Search Report—NL 2004574.

(Continued)

*Primary Examiner* — James R Bidwell
(74) *Attorney, Agent, or Firm* — Womble Carlyle Sandridge & Rice, LLP

(57) ABSTRACT

An article support assembly includes a carriage for riding along a conveyor and a holder and turning block depending from and rotatable together relative to the carriage for supporting an article. Rotation of an article is effected in response to the article support and turning block moving past a turning station along a conveying path. Position stops are operatively arranged between the turning block and the carriage for holding the turning block and holder yieldably in at least one predetermined indexed orientation relative to the carriage. The position stops include at least one pair of confronting magnetic elements associated with the carriage and the turning block and located to align with each other when the turning block and holder are in the predetermined indexed orientation.

22 Claims, 2 Drawing Sheets

U.S. PATENT DOCUMENTS

| | | | |
|---|---|---|---|
| 4,406,037 A | 9/1983 | Hazenbroek | |
| 4,418,444 A | 12/1983 | Meyn et al. | |
| 4,418,445 A | 12/1983 | Meyn et al. | |
| 4,434,526 A | 3/1984 | van Mil | |
| 4,439,891 A | 4/1984 | van Mil | |
| 4,468,838 A | 9/1984 | Sjöström et al. | |
| 4,510,886 A | 4/1985 | van Mil | |
| 4,514,879 A | 5/1985 | Hazenbroek | |
| 4,516,290 A | 5/1985 | van Mil | |
| 4,524,489 A | 6/1985 | van Mil | |
| 4,558,490 A | 12/1985 | Hazenbroek et al. | |
| 4,559,672 A | 12/1985 | Hazenbroek et al. | |
| 4,567,624 A | 2/1986 | van Mil | |
| 4,570,295 A | 2/1986 | van Mil | |
| 4,574,429 A | 3/1986 | Hazenbroek | |
| 4,577,368 A | 3/1986 | Hazenbroek | |
| D283,289 S | 4/1986 | Hazenbroek | |
| 4,593,432 A | 6/1986 | Hazenbroek | |
| 4,597,133 A | 7/1986 | van den Nieuwelaar | |
| 4,597,136 A | 7/1986 | Hazenbroek | |
| 4,635,317 A | 1/1987 | van der Eerden | |
| 4,639,973 A | 2/1987 | van der Eerden | |
| 4,639,974 A | 2/1987 | Olson | |
| 4,639,975 A | 2/1987 | van der Eerden | |
| 4,646,384 A | 3/1987 | van der Eerden | |
| 4,651,383 A | 3/1987 | van der Eerden | |
| 4,653,147 A | 3/1987 | van der Eerden | |
| 4,682,386 A | 7/1987 | Hazenbroek et al. | |
| 4,704,768 A | 11/1987 | Hutting et al. | |
| 4,723,339 A | 2/1988 | van den Nieuwelaar et al. | |
| 4,724,581 A | 2/1988 | van den Nieuwelaar | |
| 4,736,492 A | 4/1988 | Hazenbroek | |
| RE32,697 E | 6/1988 | Hazenbroek et al. | |
| 4,765,028 A | 8/1988 | van den Nieuwelaar et al. | |
| 4,766,644 A | 8/1988 | van den Nieuwelaar et al. | |
| 4,769,872 A | 9/1988 | Hazenbroek et al. | |
| 4,779,308 A | 10/1988 | van den Nieuwelaar et al. | |
| 4,788,749 A | 12/1988 | Hazenbroek et al. | |
| 4,811,456 A | 3/1989 | Huevel | |
| 4,811,458 A | 3/1989 | v. d. Nieuwelaar et al. | |
| 4,811,462 A | 3/1989 | Meyn | |
| 4,813,101 A | 3/1989 | Brakels et al. | |
| 4,884,318 A | 12/1989 | Hazenbroek | |
| 4,893,378 A | 1/1990 | Hazenbroek | |
| 4,894,885 A | 1/1990 | Markert | |
| 4,896,399 A | 1/1990 | Hazenbroek | |
| 4,899,421 A | 2/1990 | Van Der Eerden | |
| 4,918,787 A | 4/1990 | Hazenbroek | |
| 4,928,351 A | 5/1990 | van den Nieuwelaar et al. | |
| 4,935,990 A | 6/1990 | Linnenbank | |
| 4,939,813 A | 7/1990 | Hazenbroek | |
| 4,958,694 A | 9/1990 | van den Nieuwelaar et al. | |
| 4,965,908 A | 10/1990 | Meyn | |
| 4,972,549 A | 11/1990 | van den Nieuwelaar et al. | |
| 4,993,113 A | 2/1991 | Hazenbroek | |
| 4,993,115 A | 2/1991 | Hazenbroek | |
| 5,001,812 A | 3/1991 | Hazenbroek | |
| 5,013,431 A | 5/1991 | Doets | |
| 5,015,213 A | 5/1991 | Hazenbroek | |
| 5,019,013 A | 5/1991 | Hazenbroek | |
| 5,026,983 A | 6/1991 | Meyn | |
| 5,035,673 A | 7/1991 | Hazenbroek | |
| 5,037,351 A | 8/1991 | van den Nieuwelaar et al. | |
| 5,041,054 A | 8/1991 | van den Nieuwelaar et al. | |
| 5,045,022 A | 9/1991 | Hazenbroek | |
| 5,060,596 A | 10/1991 | Esbroeck | |
| 5,064,402 A | 11/1991 | Koops | |
| 5,067,927 A | 11/1991 | Hazenbroek et al. | |
| 5,069,652 A | 12/1991 | Hazenbroek | |
| 5,074,823 A | 12/1991 | Meyn | |
| 5,088,959 A | 2/1992 | Heemskerk | |
| 5,090,940 A | 2/1992 | Adkison | |
| 5,098,333 A | 3/1992 | Cobb | |
| 5,104,351 A | 4/1992 | van den Nieuwelaar et al. | |
| 5,122,090 A | 6/1992 | van den Nieuwelaar et al. | |
| 5,123,871 A | 6/1992 | van den Nieuwelaar et al. | |
| 5,125,498 A | 6/1992 | Meyn | |
| 5,147,240 A | 9/1992 | Hazenbroek et al. | |
| 5,147,241 A | 9/1992 | Rudin | |
| 5,154,664 A | 10/1992 | Hazenbroek et al. | |
| 5,154,665 A | 10/1992 | Hazenbroek | |
| RE34,149 E | 12/1992 | Markert | |
| 5,173,076 A | 12/1992 | Hazenbroek | |
| 5,173,077 A | 12/1992 | van den Nieuwelaar et al. | |
| 5,176,563 A | 1/1993 | van den Nieuwelaar et al. | |
| 5,176,564 A | 1/1993 | Hazenbroek | |
| 5,178,890 A | 1/1993 | van den Nieuwelaar et al. | |
| 5,186,679 A | 2/1993 | Meyn | |
| 5,188,559 A | 2/1993 | Hazenbroek | |
| 5,188,560 A | 2/1993 | Hazenbroek | |
| 5,194,035 A | 3/1993 | Dillard | |
| 5,197,917 A | 3/1993 | Verbakel et al. | |
| 5,199,922 A | 4/1993 | Korenberg et al. | |
| 5,222,905 A | 6/1993 | Van den Nieuwelaar et al. | |
| 5,242,324 A | 9/1993 | Koops | |
| 5,248,277 A | 9/1993 | Bos et al. | |
| 5,256,101 A | 10/1993 | Koops | |
| 5,269,721 A | 12/1993 | Meyn | |
| 5,277,649 A | 1/1994 | Adkison | |
| 5,277,650 A | 1/1994 | Meyn | |
| 5,279,517 A | 1/1994 | Koops | |
| 5,290,187 A | 3/1994 | Meyn | |
| 5,299,975 A | 4/1994 | Meyn | |
| 5,299,976 A | 4/1994 | Meyn | |
| 5,318,428 A | 6/1994 | Meyn | |
| 5,326,311 A | 7/1994 | Persoon et al. | |
| 5,334,083 A | 8/1994 | van den Nieuwelaar et al. | |
| 5,336,127 A | 8/1994 | Hazenbroek | |
| 5,340,351 A | 8/1994 | Minderman et al. | |
| 5,340,355 A | 8/1994 | Meyn | |
| 5,342,237 A | 8/1994 | Kolkman | |
| 5,344,359 A | 9/1994 | Kolkman | |
| 5,344,360 A | 9/1994 | Hazenbroek | |
| 5,366,406 A | 11/1994 | Hobbel et al. | |
| 5,370,574 A | 12/1994 | Meyn | |
| 5,372,246 A | 12/1994 | van Aalst | |
| RE34,882 E | 3/1995 | Meyn | |
| 5,429,549 A | 7/1995 | Verrijp et al. | |
| 5,439,702 A | 8/1995 | French | |
| 5,453,045 A | 9/1995 | Hobbel et al. | |
| 5,462,477 A | 10/1995 | Ketels | |
| 5,470,194 A | 11/1995 | Zegers | |
| 5,487,700 A | 1/1996 | Dillard | |
| 5,490,451 A * | 2/1996 | Nersesian | 99/420 |
| 5,505,657 A | 4/1996 | Janssen et al. | |
| 5,549,521 A | 8/1996 | van den Nieuwelaar et al. | |
| D373,883 S | 9/1996 | Dillard | |
| 5,569,067 A | 10/1996 | Meyn | |
| 5,595,066 A | 1/1997 | Zwanikken et al. | |
| 5,605,503 A | 2/1997 | Martin | |
| 5,643,072 A | 7/1997 | Lankhaar et al. | |
| 5,643,074 A | 7/1997 | Linnenbank | |
| 5,672,098 A | 9/1997 | Veraart | |
| 5,676,594 A | 10/1997 | Joosten | |
| 5,704,830 A | 1/1998 | Van Ochten | |
| 5,713,786 A | 2/1998 | Kikstra | |
| 5,713,787 A | 2/1998 | Schoenmakers et al. | |
| 5,741,176 A | 4/1998 | Lapp et al. | |
| 5,755,617 A | 5/1998 | van Harskamp et al. | |
| 5,759,095 A | 6/1998 | De Weerd | |
| 5,766,063 A | 6/1998 | Hazenbroek et al. | |
| 5,782,685 A | 7/1998 | Hazenbroek et al. | |
| 5,785,588 A | 7/1998 | Jacobs et al. | |
| 5,803,802 A | 9/1998 | Jansen | |
| 5,810,651 A | 9/1998 | De Heer et al. | |
| 5,810,653 A | 9/1998 | Van Craaikamp et al. | |
| 5,813,908 A | 9/1998 | Craaikamp | |
| 5,827,116 A | 10/1998 | Al et al. | |
| 5,833,527 A | 11/1998 | Hazenbroek et al. | |
| 5,865,672 A | 2/1999 | Hazenbroek | |
| 5,875,738 A | 3/1999 | Hazenbroek et al. | |
| 5,947,811 A | 9/1999 | Hazenbroek et al. | |
| 5,951,393 A | 9/1999 | Barendregt | |
| 5,975,029 A | 11/1999 | Morimoto et al. | |
| 5,976,004 A | 11/1999 | Hazenbroek | |
| 5,980,377 A | 11/1999 | Zwanikken et al. | |
| 6,007,416 A | 12/1999 | Janssen et al. | |

| | | | | | | |
|---|---|---|---|---|---|---|
| 6,007,417 | A | 12/1999 | Jones et al. | 7,261,629 B2 | 8/2007 | Holleman |
| 6,024,636 | A | 2/2000 | Hazenbroek et al. | 7,284,973 B2 | 10/2007 | van Esbroeck et al. |
| 6,027,403 | A | 2/2000 | Hazenbroek et al. | 7,302,885 B2 | 12/2007 | Townsend |
| 6,027,404 | A | 2/2000 | Wols | 7,344,437 B2 | 3/2008 | Van den Nieuwelaar et al. |
| 6,029,795 | A | 2/2000 | Janssen et al. | D565,941 S | 4/2008 | Peters et al. |
| 6,033,299 | A | 3/2000 | Stone et al. | 7,357,707 B2 | 4/2008 | de Vos et al. |
| 6,062,972 | A | 5/2000 | Visser | 7,476,148 B2 | 1/2009 | McQuillan et al. |
| 6,095,914 | A | 8/2000 | Cornelissen et al. | 7,494,406 B2 | 2/2009 | Van Esbroeck et al. |
| 6,126,534 | A | 10/2000 | Jacobs et al. | 7,530,888 B2 | 5/2009 | Annema et al. |
| 6,132,304 | A | 10/2000 | Aarts et al. | 7,572,176 B2 | 8/2009 | Petersen et al. |
| 6,142,863 | A | 11/2000 | Janssen et al. | 7,662,033 B1 | 2/2010 | Ritter et al. |
| 6,152,816 | A | 11/2000 | van den Nieuwelaar et al. | 7,662,034 B2 | 2/2010 | Van Hillo et al. |
| 6,176,772 | B1 | 1/2001 | Hazenbroek et al. | 7,717,773 B2 | 5/2010 | Woodford et al. |
| 6,179,702 | B1 | 1/2001 | Hazenbroek | 7,740,527 B1 | 6/2010 | Harben |
| 6,190,250 | B1 | 2/2001 | Volk et al. | 7,744,449 B2 | 6/2010 | van Esbroeck et al. |
| 6,193,595 | B1 | 2/2001 | Volk et al. | 7,824,251 B2 | 11/2010 | van den Nieuwelaar et al. |
| 6,220,953 | B1 | 4/2001 | Cornelissen et al. | 2001/0023171 A1 | 9/2001 | Hazenbroek et al. |
| 6,231,436 | B1 | 5/2001 | Bakker | 2002/0055328 A1 | 5/2002 | Schmidt et al. |
| 6,254,471 | B1 | 7/2001 | Meyn | 2002/0058470 A1 | 5/2002 | Schmidt et al. |
| 6,254,472 | B1 | 7/2001 | Meyn | 2002/0090905 A1 | 7/2002 | Moriarty |
| 6,277,021 | B1 | 8/2001 | Meyn | 2002/0168930 A1 | 11/2002 | Jansen et al. |
| 6,299,524 | B1 | 10/2001 | Janssen et al. | 2003/0008606 A1 | 1/2003 | Hazenbroek et al. |
| 6,306,026 | B1 | 10/2001 | Post | 2003/0084856 A1 | 5/2003 | Hazenbroek et al. |
| 6,322,438 | B1 | 11/2001 | Barendregt | 2003/0092372 A1 | 5/2003 | Aandewiel et al. |
| 6,358,136 | B1 | 3/2002 | Volk et al. | 2004/0198209 A1 | 10/2004 | Hazenbroek et al. |
| 6,371,843 | B1 | 4/2002 | Volk et al. | 2004/0235409 A1 | 11/2004 | Nolten et al. |
| 6,375,560 | B1 | 4/2002 | Verrijp | 2005/0037704 A1 | 2/2005 | Heer et al. |
| 6,383,069 | B1 | 5/2002 | Volk et al. | 2005/0037705 A1 | 2/2005 | Beeksma et al. |
| 6,398,636 | B1 | 6/2002 | Jansen et al. | 2005/0048894 A1 | 3/2005 | van Hillo et al. |
| 6,446,352 | B2 | 9/2002 | Middelkoop et al. | 2005/0186897 A1 | 8/2005 | Holleman |
| 6,478,668 | B2 | 11/2002 | Visser et al. | 2005/0221748 A1 | 10/2005 | Hillo et al. |
| 6,530,466 | B2 * | 3/2003 | Murata et al. ............... 198/465.4 | 2006/0099899 A1 | 5/2006 | Hazenbroek et al. |
| 6,599,179 | B1 | 7/2003 | Hazenbroek et al. | 2006/0217051 A1 | 9/2006 | Gerrits |
| 6,612,919 | B2 | 9/2003 | Janset et al. | 2007/0082595 A1 | 4/2007 | de Vos et al. |
| 6,656,032 | B2 | 12/2003 | Hazenbroek et al. | 2007/0221071 A1 | 9/2007 | Kuijpers et al. |
| 6,726,556 | B2 | 4/2004 | Gooren et al. | 2007/0224306 A1 | 9/2007 | van Esbroeck et al. |
| 6,736,717 | B1 | 5/2004 | Annema et al. | 2008/0017050 A1 | 1/2008 | van Esbroeck et al. |
| 6,764,393 | B1 | 7/2004 | Hazenbroek et al. | 2008/0125025 A1 | 5/2008 | Van Den Nieuwelaar et al. |
| 6,783,451 | B2 | 8/2004 | Aandewiel et al. | 2008/0171506 A1 | 7/2008 | Nieuwelaar et al. |
| 6,811,478 | B2 | 11/2004 | van den Nieuwelaar et al. | 2009/0239457 A1 | 9/2009 | Jansen et al. |
| 6,811,480 | B2 | 11/2004 | Moriarty | 2009/0320761 A1 | 12/2009 | Grave et al. |
| 6,811,802 | B2 | 11/2004 | van Esbroeck et al. | 2010/0022176 A1 | 1/2010 | Van Den Nieuwelaar et al. |
| 6,830,508 | B2 | 12/2004 | Hazenbroek et al. | 2010/0029186 A1 | 2/2010 | Janssen et al. |
| 6,837,782 | B2 | 1/2005 | Hetterscheid et al. | 2010/0048114 A1 | 2/2010 | Van Den Nieuwelaar et al. |
| 6,899,613 | B2 | 5/2005 | van den Nieuwelaar et al. | 2010/0062699 A1 | 3/2010 | Sorensen et al. |
| 6,912,434 | B2 | 6/2005 | van den Nieuwelaar et al. | 2010/0075584 A1 | 3/2010 | Aandewiel et al. |
| 6,986,707 | B2 | 1/2006 | van den Nieuwelaar et al. | 2010/0081366 A1 | 4/2010 | De Vos et al. |
| 7,018,283 | B2 | 3/2006 | Schmidt et al. | 2010/0120344 A1 | 5/2010 | Van Den Nieuwelaar et al. |
| 7,029,387 | B2 | 4/2006 | van den Nieuwelaar et al. | 2010/0151779 A1 | 6/2010 | Bakker |
| 7,059,954 | B2 | 6/2006 | Annema et al. | 2010/0221991 A1 | 9/2010 | Hagendoorn |
| 7,063,611 | B2 | 6/2006 | Nolten et al. | | | |
| 7,066,806 | B2 | 6/2006 | de Heer et al. | | | |
| 7,070,493 | B2 | 7/2006 | Hazenbroek et al. | | | |
| 7,115,030 | B2 | 10/2006 | van Hillo et al. | | | |
| 7,125,330 | B2 | 10/2006 | Beeksma et al. | | | |
| 7,128,937 | B2 | 10/2006 | van den Nieuwelaar et al. | | | |
| 7,133,742 | B2 | 11/2006 | Cruysen et al. | | | |
| 7,172,781 | B2 | 2/2007 | Kish | | | |
| 7,232,365 | B2 | 6/2007 | Annema et al. | | | |
| 7,232,366 | B2 | 6/2007 | van den Nieuwelaar et al. | | | |
| 7,249,998 | B2 | 7/2007 | van Esbroeck et al. | | | |

FOREIGN PATENT DOCUMENTS

| | | |
|---|---|---|
| EP | 2 181 841 A1 | 5/2010 |
| FR | 2 529 177 A1 | 12/1983 |
| GB | 1 395 722 A | 5/1975 |

OTHER PUBLICATIONS

Written Opinion—NL 2004574.

* cited by examiner

ROTATABLE INDEXED ARTICLE SUPPORT FOR A CONVEYOR

REFERENCE TO RELATED APPLICATION

Priority is hereby claimed under 35 USC §119 to the filing date of Dutch patent application number N2004574 filed in the Netherlands on 19 Apr. 2010.

TECHNICAL FIELD

This disclosure relates generally to suspension hangers for overhead conveyor systems. More particularly, the invention relates to rotatable suspension hangers commonly referred to as shackles as used in processing lines for slaughtered animals such as poultry. In such systems, poultry carcasses are suspended by their legs for movement along a processing path past subsequent processing stations to be eviscerated, cut up, and otherwise processed into edible parts and pieces.

BACKGROUND

Article supports or shackles are in common use on poultry and fowl processing lines. One example is described in European patent EP 0786208, which discloses a shackle assembly for suspending poultry carcasses by their legs for movement along a conveyor track. The track defines a processing path of a poultry processing line and suspended carcasses engage various processing stations along the line as the carcasses move along the processing path. More specifically, a plurality of carriages are supported in spaced relationship and moved along the conveyor track by a transport chain. Shackles are rotatably mounted with respect to the carriages and a turning block associated and rotatable with each shackle is adapted to cooperate with features along the processing path to rotate the shackles between predetermined rotary orientations. Such orientation is necessary because the carcasses must be aligned in various different orientations as they engage the various processing machines at stations along the processing path. At the location of individual processing stations the turning blocks are usually confined between opposite parallel side guides to prevent accidental rotation of the turning blocks and thus the shackles and carcasses suspended therefrom. This inhibits any rotation of the carcasses as they are being processed through the machinery at the station.

In between the processing stations, the parallel side guides that prevent rotation of the shackles and carcasses may be interrupted. The side guides may also be interrupted where the turning block is engaged by turning features at a turning station to effect rotation of the turning block and shackle. More specifically, the turning block, in one exemplary embodiment, has a substantially square body with slots extending inwardly from its corners. These slots are configured and positioned to be engaged by one or more turning pins at a turning station positioned along the conveyor path. The turning pins may be attached to a plate and project into the path of movement of the turning blocks so that the pins engage the slots and rotate the turning blocks as the turning blocks move past the pins.

A yieldable indexing arrangement may be disposed between the carriage and the turning block to provide for indexed rotations to predetermined orientations of the turning block and shackle in, for example, ninety degree increments. The rotary orientations of the shackles are generally maintained by the indexing arrangement as the shackles move further along the track. This can be of particular importance at locations along the processing path where the lateral side guides are interrupted or not present. The yieldable indexing arrangement typically includes a spring biased ball and socket assembly that includes a cavity for holding the ball and spring on one of the relatively rotatable parts and a ball receiving recess or detent on the other relatively rotatable part. When the turning block is rotated to an indexed orientation, the ball is forced by the spring into the detent of the opposing part to hold the turning block, and thus the shackle and a carcass suspended therefrom, yieldably in the indexed orientation.

These prior art indexing arrangements are common and have been somewhat successful to ensure proper indexed rotations of the turning block and shackle. However, they can be problematic in food processing equipment because they include cavities, recesses, detents, and mechanical parts that may collect food material and are difficult to clean. Such indexing arrangements therefore can pose serious hazards of bacterial contamination of animal carcasses and parts processed along the processing path.

Accordingly a need exists to overcome or ameliorate at least one of the disadvantages of the prior art, and particularly prior art indexing arrangements in food processing equipment. There also is a need to provide alternative structures that are less cumbersome in assembly and operation and that moreover can be made relatively inexpensively and easily. Perhaps more salient, a need exists for an indexing arrangement that eliminates open cavities, recesses, detents, and mechanical parts that can collect food material and be a contamination hazard. Alternatively it is an object of the invention at least to provide consumers with a useful choice.

SUMMARY

Dutch patent application serial number N2004574, to which priority is claimed above, is hereby incorporated by reference in its entirety.

Briefly described, an article support is disclosed for movement by a conveyor along a conveying path having treatment or processing stations and turning stations disposed therealong. In the preferred embodiment, the article support includes a shackle for supporting animal carcasses moving along a processing line. The article support has a carriage for engagement by and movement along a conveyor and a holder for supporting an article to be processed. The holder is rotatably mounted with respect to the carriage, and a turning block is associated and rotatable with the holder. Rotation of the turning block causes corresponding rotation of the holder about a substantially vertical axis.

The turning block is configured to be selectively rotated in response to being moved past a turning station along the processing path. An indexing arrangement in the form of position locks are operatively arranged between the turning block and the carriage for yieldably holding the turning block and thus the article support in at least a first and a second incremental rotational orientation, or indexed orientation, with respect to the processing path.

The position locks include magnetic elements associated with the turning block and with the carriage with at least one turning block magnet being located to align with at least one carriage magnet when the turning block is in the first indexed orientation and when the turning block is in the second indexed orientation. Thus, when the turning block and article support are rotated to or near one of the indexed orientations, the aligned confronting magnetic elements attract one another to hold the turning block and article support yieldably in that indexed orientation. The indexed orientations are obtainable without any mechanical contact between position lock elements, without any recesses or detents in the carriage or the turning block, and without any mechanical components. Thus, contamination build-up common with prior art position lock mechanisms is substantially reduced. Also, wear and tear on the position locks is entirely eliminated as well as noise production upon indexing of the turning block and article support. The incremental indexed orientations are strictly defined, but are also resiliently yieldable to either side of the indexed orientations. This has been found to enhance greatly a smooth transition from one indexed orientation into the other and to return the system quickly to an indexed orientation if accidently displaced therefrom.

The indexing arrangement or position locks of this disclosure may provide for a third position of indexed orientation and include one or more additional magnetic elements that align with another magnetic element at the third indexed orientation. A fourth position of indexed orientation may be provided by one or more yet additional magnetic elements that align with other magnetic elements at the fourth indexed orientation. The turning block can include a substantially square peripheral contour with four corner apexes. Each corner apex may define an inwardly extending slot that opens at the apex, the slots being configured and arranged to engage features such as projecting turning pins of a turning station. Such an embodiment is particularly suitable for use in combination with a conveyor and turning station of the type disclosed in European patent EP 0786208.

In one embodiment, the magnetic elements include an at least one upper magnet in a lower face of the carriage and at least one lower magnet in an upper face of the turning block. The magnets are oriented so that the negative pole of one magnet faces the positive pole of the other magnet when the magnets are aligned. The lower face of the carriage may be part of a separately mounted base of the carriage. This in particular enables the turning block to be rotatably mounted to the base.

It is preferable, though not required, that the magnetic elements comprise Neodymium magnets. This rare earth magnetic material is very strong, does not decay significantly in magnetic attraction over time, and allows the magnetic elements to be very powerful and yet be of relatively modest size.

The carriage may also include a chain block for receiving a conveyor chain so that the carriage assembly can be conveniently supported for movement along an overhead conveyor track.

In one preferred embodiment, the article support takes the form of a article support or shackle for supporting fowl or poultry carcasses by their legs from the overhead conveyor track.

The disclosed assembly with magnetic position locks is useful as a hanger assembly for food processing equipment, such as poultry and fowl processing lines, at least in part because it eliminates cavities and mechanical contact areas within the position lock mechanism and thereby reduces the risk of contamination and bacterial growth. The hanger assembly according to the invention may also be useful in general industrial processing equipment, because its indexing means has no mechanical contact and thereby reduces friction, wear, and noise.

Further advantageous aspects and features of the invention will become clear from the detailed description set forth below, the appended claims, and the drawing figures, which are briefly described as follows.

DETAILED DESCRIPTION OF EXEMPLARY EMBODIMENTS

Figure 1:
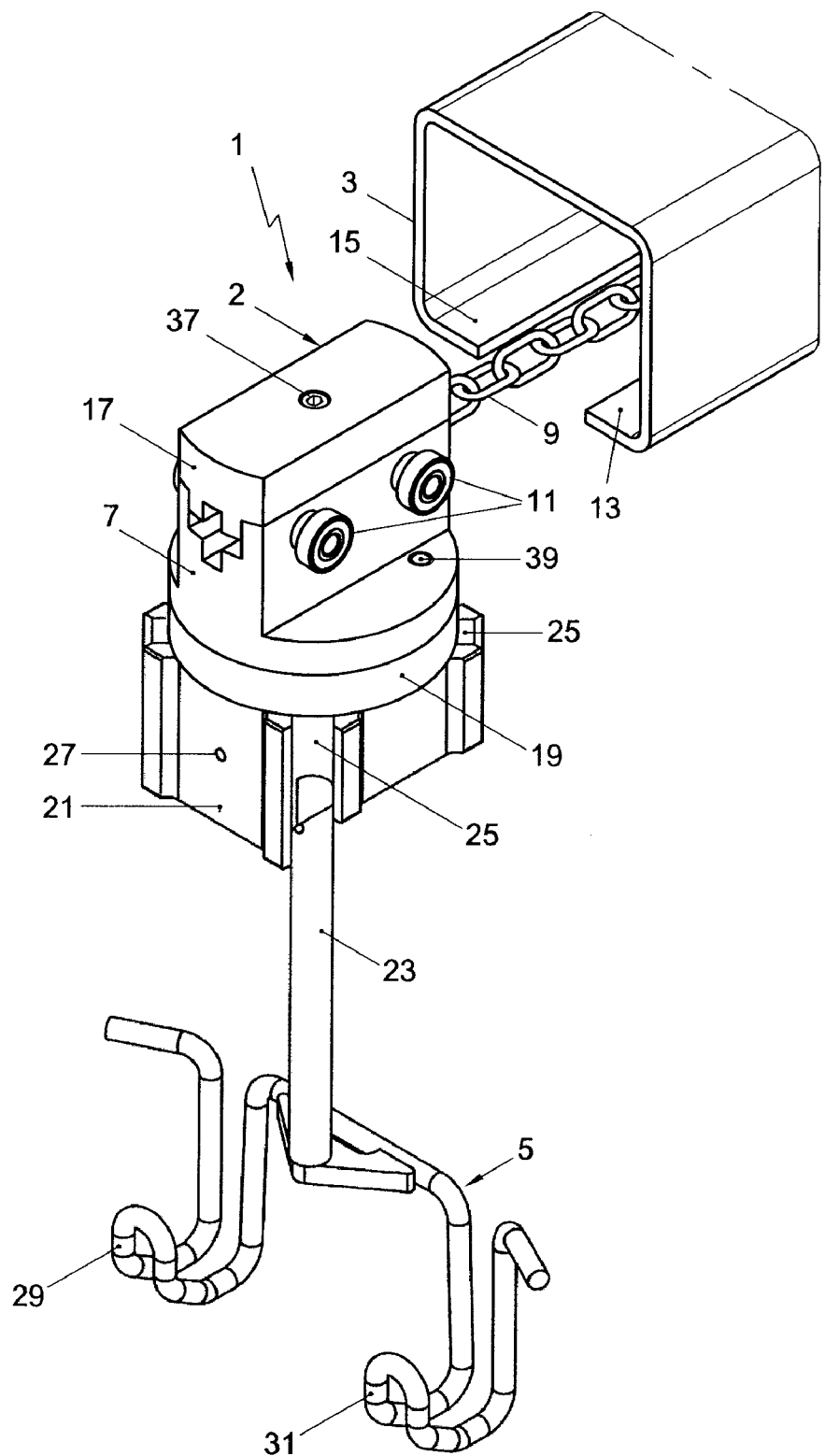
FIG. 1 is a perspective view illustrating the rotatable article support of the disclosure in position for engagement with an overhead conveyor.

Reference will now be made in more detail to the drawing figures, wherein like reference numerals generally indicate like parts throughout the views. FIG. 1 illustrates an article support assembly 1 that embodies principles of the invention in one preferred form. The article support assembly 1 in this embodiment includes an upper carriage 2 configured to be mounted to and transported along an overhead conveyor track 3. An article support in the form of a shackle 5 depends from and forms a lower part of the article support assembly 1. The upper carriage 2 of the article support assembly 1 includes a chain block 7 that can be affixed to a conveyor chain 9. For clarity, the conveyor chain 9 is only shown as extending from one end of the chain block 7 in the conveyor track 3. In reality, the conveyor chain extends from both ends of the chain block 7 and interconnects a plurality of article support assemblies 1 at regularly spaced intervals along the conveyor track 3. The chain is driven to move the article support assemblies along the conveyor track. The chain block 7 is provided with rollers 11 to support the chain block 7 and the article support assembly 1 for movement along the in-turned flanges 13, 15 of conveyor track 3. The chain block 7 of the carriage 2 may have a chain cap 17 to enable connection, removal, and adjustment of the chain block 7 on the conveyor chain 9. A base 19 may be mounted against a lower surface of the chain block 7 and may be separate or integral.

A turning block 21 is pivotally or rotatably attached relative to the base 19 of the carriage 2 so as to be rotatable about a generally vertical axis. In this example a shaft 23 carrying the shackle 5 is aligned with the vertical axis about which the turning block 21 rotates. The shaft 23 is fixed to the turning block 21 so that the shackle is rotated when the turning block rotates. It is possible to have the shackle 5 offset with respect to the rotational axis of the turning block, so that selective rotation of the turning block may be used to move the shackle out of the conveyor path to bypass certain stations along the conveyor path if desired.

The turning block 21 in the illustrated embodiment has four sides and four slots 25 on its corners to effect rotation as described in the aforementioned EP 0786208, which is hereby incorporated by reference. The shaft 23 is non-rotatably fixed to the turning block 21 by a pin engaged in a bore 27 that extends through the turning block and through the shaft 23. At the lower end of the shaft 23 the shackle 5 has a pair of first and second hooks 29, 31 configured to receive and hold the legs of a fowl or poultry carcass. It will be understood, however, that other elements could depend from the shaft 23 when it is desired to transport articles other than carcasses between processing or treating stations by means of a conveyor.

Figure 2:
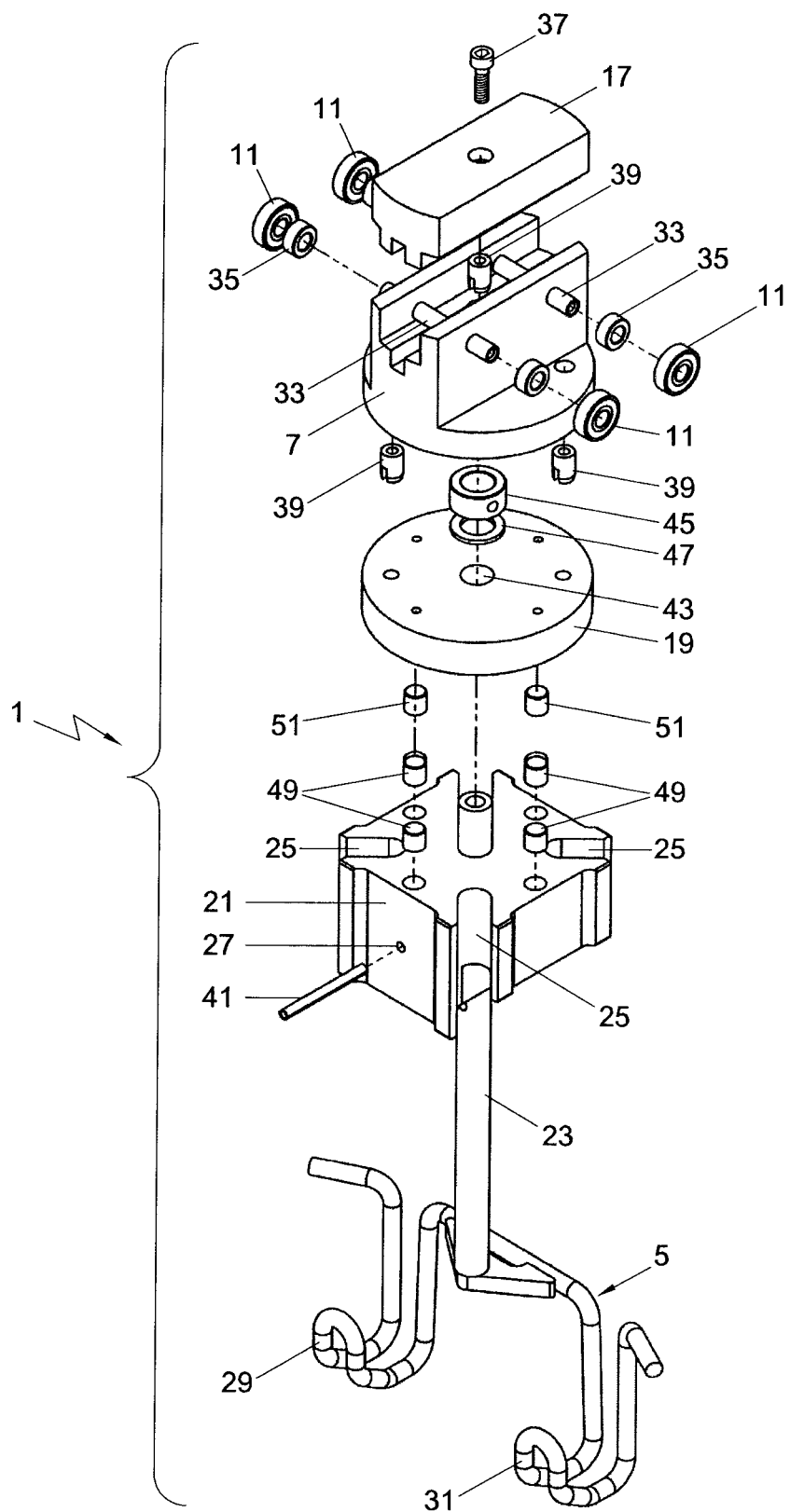
FIG. 2 is an exploded perspective illustration of the rotatable article support of FIG. 1.

FIG. 2 shows the article support assembly 1 of FIG. 1 in an exploded perspective view. The chain block 7 is shown with the chain cap 17 lifted and its interior exposed. Transverse shafts 33 can be used in locating and securing the article support assembly to the chain links of the conveyor chain. The lateral ends of the transverse shafts each may carry a relevant one of the rollers 11. The rollers 11 are each spaced from the body of the chain block 7 by distance collars or spacers 35. The chain cap 17 is mountable to the chain block 7 by a screw 37 or other appropriate fastener. The chain block 7 is conveniently made from a plastic material, such as Nylon or another high density polymer, a threaded metal insert 39 may be employed to receive the threads of the screw 37. Further mounting inserts 39 may also be employed for the fixing the base 19 to the chain block 7 by additional screw fasteners (not shown, but conventional). The base 19 rotatably supports the turning block 21 by a top end of the shaft 23 that extends centrally through the turning block 21 and through the base 19 where it is secured with a retaining collar 45 and washer 47. The shaft 23, in turn, is non-rotatably fixed to the turning block 21 by a cross pin 41 engageable in through bore 27 and through a corresponding transverse bore in the shaft 23.

Inserted and fitting tightly in corresponding cavities in the top surface of the turning block 21 are lower magnets 49. The lower magnets 49 correspond in number to the four indexed orientations (in the illustrated embodiment) to which the turning block 21 may be rotated. Other configurations with a different number of lower magnets are of course easily possible and all such numbers and arrangements of magnets are included in the present invention. Received and fitting tightly in a lower face of the base 19 are a number (four in this case) of upper magnets 51 of which only two are visible in FIG. 2. The number upper magnets need not necessarily be the same as the number of lower magnets. For example, with the four indexed positions in this embodiment, two upper magnets or even one for that matter may be sufficient to lock the turning block yieldably in all four indexed orientations, albeit with less holding force. More broadly, it is only required that at least one magnet of the carriage align with at least one magnet of the turning block in each of the indexed orientations. In any event, the lower and upper magnets 49, 51 preferably are sintered rare earth magnets containing Neodymium or ceramic magnets of a ferrous material. With the polarity of the lower and upper magnets 49, 51 properly directed (opposite poles of confronting magnets facing each other), strong indexed orientations of the turning block are established by the confronting magnets attracting one another when aligned or nearing alignment.

A significant advantage of the magnetic position locks described above is that the indexed orientations of the turning block and shackle are established without any mechanical contact and without any recesses or detents. The risk of a build-up of contamination is thus reduced, and problems associated with mechanical wear of prior art position locks are eliminated. Furthermore the incremental indexed orientations, while being strictly defined, are at the same time also resiliently yieldable about their exact positions. This yieldability greatly enhances the smooth transition from one indexed orientation to another and with virtually no noise production. In addition, it has been found that the magnets begin to attract one another well before they are physically aligned with each other. Accordingly, if the turning block 21 is within tens of degrees of an indexed orientation, the magnets will cause it to "snap" to the precise indexed orientation in short order. Because of this, if the turning block and shackle are disturbed from one of the indexed orientations by, for instance, engagement with a foreign object or a worker, they will quickly snap back to the indexed orientation by virtue of the magnetic attraction of the magnets. This is not the case with prior art mechanical position locks, which are either fully engaged at an indexed orientation or fully disengaged away from an indexed orientation.

Thus an article support assembly 1 is disclosed for movement by a conveyor 3 along a conveying path that has treatment units and turning stations therealong. The article support assembly 1 includes a carriage 2 for engagement by a conveyor 3, and a holder 5 for supporting an article with the holder being rotatably mounted with respect to the carriage 2. A turning block 21 is associated with the holder 5 to enable rotation of a supported article about a vertical axis. Rotation is affected in response to the article support assembly 1 being moved past a turning station along a conveying path (such as explained in more detail in EP 0786208). Position locks are further operatively arranged between the turning block 21 and the carriage 2 for yieldably holding the turning block and holder in at least a first and a second indexed orientation. The position locks includes magnetic elements 49, 51. The magnetic elements 49, 51 are located in accordance with the relevant first and second indexed orientations. More particularly, the magnets are positioned so that at least one pair, and preferably more than one pair, align with one another when the turning block 21 and holder 5 are in their indexed orientations to hold these elements magnetically but yieldably in place. The article support assembly 1 is useful as a rotatable suspension hanger or shackle for food processing equipment, such as poultry and fowl processing lines that include an overhead conveyor.

It is believed that the operation and construction of the present invention will be apparent from the foregoing description of illustrative embodiments. To the skilled person in this field of art it will be clear that the invention is not limited to the embodiments and examples represented and described here, but that within the framework of the appended claims a large number of variants, both subtle and gross, are possible. Also kinematic inversions are considered inherently disclosed and to be within the scope of the present invention. The terms comprising and including when used in this description or the appended claims should not be construed in an exclusive or exhaustive sense but rather in an inclusive sense. Features that are not specifically or explicitly described or claimed may be additionally included in the structure according to the present invention within its scope. These and other additions, deletions, and modifications might well be made by one of ordinary skill in the art without departing from the spirit and scope of the invention, which is circumscribed only by the claims.

What is claimed is:

1. An article support assembly for movement by a conveyor along a conveying path having treatment units and turning stations therealong, the article support comprising:
   a carriage for engagement with the conveyor;
   a holder mounted to the carriage, the holder being configured to support an article being moved along the conveying path;
   the holder being rotatably mounted with respect to the carriage;
   a turning block associated with the holder, rotation of the turning block causing corresponding rotation of the holder relative to the carriage;
   position locks operatively arranged between the turning block and the carriage for holding the turning block yieldably in at least a first and a second incremental indexed orientation with respect to the conveying path;
   the position locks comprising magnetic elements including elements configured to align substantially when the turning block is in the first indexed orientation and elements configured to align substantially when the turning block is in the second indexed orientation.

2. The article support of claim 1, wherein the position locks hold the turning block yieldably in a third position of incremental indexed orientation and wherein the magnetic elements include elements configured to align substantially when the turning block is in the third indexed orientation.

3. The article support assembly of claim 2, wherein the position locks hold the turning block in a fourth position of incremental indexed orientation and wherein the magnetic elements include elements configured to align substantially when the turning block is in the fourth indexed orientation.

4. The article support assembly of claim 3, wherein the turning block has a substantially square peripheral contour with four corner apexes and defines inwardly extending slots opening at the corner apexes, the slots being arranged for selective engagement by a turning station to rotate the turning block selectively as it moves past the turning station.

5. The article support of claim 1, wherein the magnetic elements comprise an upper magnet in a lower face of the carriage and a lower magnet in an upper face of the turning block.

6. The article support of claim 5 and further comprising a base on the carriage and wherein the lower face of the carriage is defined by a surface of the base.

7. The article support of claim 6, wherein the turning block is rotatably mounted to the base.

8. The article support of claim 1 and wherein the magnetic elements include Neodymium.

9. The article support of claim 1 wherein the carriage includes a chain block for receiving a conveyor chain.

10. The article support of claim 1 wherein the carriage is configured to be supported for movement along an overhead conveyor track.

11. The article support of claim 1 wherein the holder comprises an article support for supporting fowl or poultry carcasses by their legs from the overhead conveyor track.

12. The article support of claim 11, wherein the article support comprises a shackle with first and second hooks for receiving the leg parts of fowl or poultry carcasses.

13. The article support of claim 1 and wherein the holder comprises a shackle for use in a poultry and/or fowl processing line.

14. The article support of claim 1 and wherein the magnetic elements comprise a first pair of elements configured to align when the tuning block is in the first indexed orientation and a second pair of elements configured to align when the turning block is in the second indexed orientation.

15. An article support assembly for supporting articles as they are moved along a processing path by a conveyor, the article support assembly comprising:
   a carriage mountable to the conveyor for movement therealong;
   an article holder depending from the carriage and configured to receive and hold articles to be moved along the processing path;
   the article holder being rotatable with respect to the carriage; and
   at least one pair of magnets associated with the carriage and the holder, the magnets of the pair being positioned and configured to align substantially with each other when the article holder is in at least one predetermined rotary orientation with respect to the carriage to maintain the holder yieldably in the predetermined rotary orientation.

16. An article support assembly as claimed in claim 15 and further comprising a turning block rotatably mounted to the carriage, the holder being fixed to and rotatable with the turning block.

17. An article support assembly as claimed in claim 16 and wherein one of the pair of magnets is disposed in the turning block and the other of the pair of magnets is disposed in the carriage.

18. An article support assembly as claimed in claim 16 and wherein the carriage includes a base and wherein the other of the pair of magnets is disposed in the base.

19. An article support assembly as claimed in claim 15 and further comprising at least one additional magnet associated with the carriage or the holder, the at least one additional magnet positioned and configured to align with another magnet on the holder or carriage when the holder is in at least one additional rotary orientation with respect to the carriage.

20. An article support assembly as claimed in claim 15 and wherein the at least one pair of magnets comprises a plurality of magnets configured and positioned to align in pairs when the holder is in either of four predetermined indexed orientations.

21. A method of establishing yieldable indexed orientations of a poultry shackle with respect to a conveyor carriage from which it depends, the method comprising magnetically attracting the poultry shackle to each of the indexed orientations as the poultry shackle is rotated toward the indexed orientations, wherein the step of magnetically attracting comprises mounting a magnet in a fixed position relative to the carriage and mounting a magnet in a fixed position relative to the shackle with the magnets being located to align substantially when the poultry shackle is in an indexed orientation.

22. A poultry shackle assembly comprising:
   a carriage;
   a base on the carriage;
   a turning block rotatably mounted with respect to the base;
   a shackle mounted to the turning block and being rotatable therewith;
   a first magnet mounted in the turning block adjacent the base; and
   a second magnet mounted in the base adjacent the turning block;
   the first and second magnets being located to align substantially with each other when the turning block and shackle are in a predetermined rotary orientation with respect to the carriage.

\* \* \* \* \*